Jan. 26, 1943. C. E. STRAUSS 2,309,260
MEANS AND METHOD FOR PREPARING WORK FOR MACHINING
Filed April 9, 1940
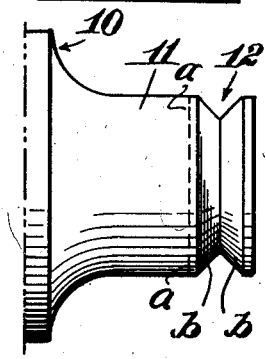
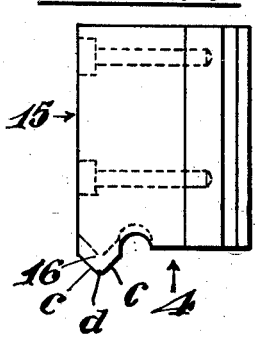
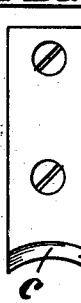
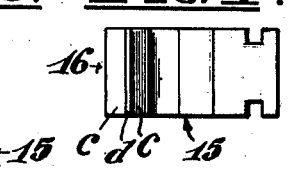
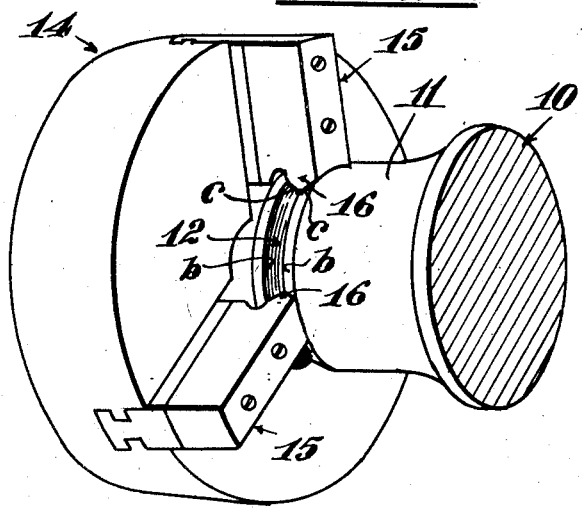
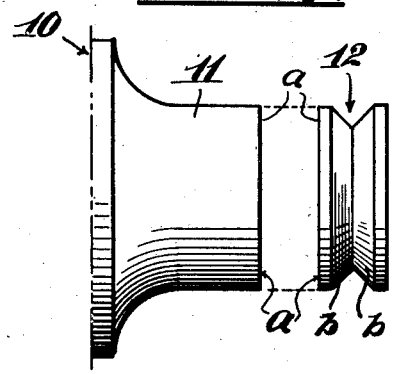
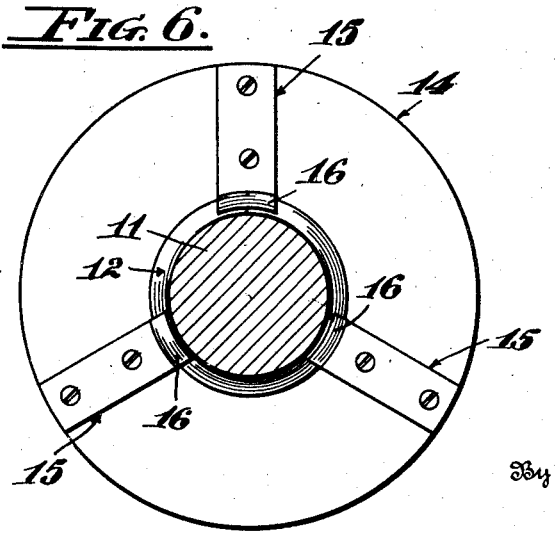
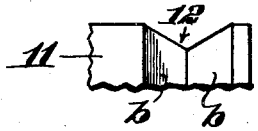
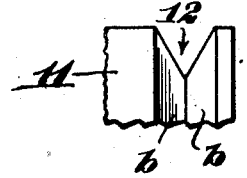
Inventor
Charles E. Strauss:
By R. S. Berry
Attorney Patented Jan. 26, 1943

2,309,260

UNITED STATES PATENT OFFICE 2,309,260

MEANS AND METHOD FOR PREPARING WORK FOR MACHINING

Charles E. Strauss, Hollywood, Calif.

Application April 9, 1940, Serial No. 328,739

5 Claims. (Cl. 82—1)

This invention relates to a method of preparing work for machining thereof and more particularly pertains to a mode of supporting objects to be worked in a chuck, and also relates to the construction of the jaw members of a chuck.

An object of the invention is to provide a means and method whereby an object to be worked may be securely fastened in a chuck in a fashion to be supported solely on the chuck and yet be maintained in a centered position with such stability as to enable simultaneous working of the article exteriorly and interiorly thereof, and whereby a considerable saving in time and labor is effected in the working of articles requiring both internal and external finishing.

Another object is to provide a mode of supporting work in a chuck which involves a simple pre-treatment of the work, together with a special construction in the jaws of a chuck for effecting cooperative engagement with the pre-formed work; the essence of the invention residing in imparting to the work and to the chuck jaws co-operating contours of a character that will insure supporting the work on a chuck against displacement other than might occur from breakage.

Another object is to provide a mode of effecting pre-forming of the work to condition it for engagement by a special chuck jaw construction in a fashion that the pre-formed portion of the work may be removed and discarded with little or no loss or reworked either as part of the work under treatment or to produce an independent article of manufacture, such as a grooved wheel or pulley.

A further object is to provide a method of preparing work, such as castings, for machining operations consisting in providing the work with a cylindrical projection such as a work-lug and forming the projection with a continuous V-groove extending circumferentially around its periphery with the margins and apex of the groove lying on planes perpendicular to the axis of the projection, whereby the work may be securely supported in a chuck without the employment of a steady rest and in such fashion that the work may be roughed out and finished both internally and externally simultaneously without removal from the chuck.

With the foregoing objects in view, together with such other objects and advantages as may subsequently appear, the invention is carried into effect as illustrated by way of example in the accompanying drawing, in which:

Fig. 1 is a view in elevation of an article to be supported in a chuck for working thereof, and depicting the manner of pre-forming the work preparatory to mounting it in the chuck;

Fig. 2 is a view in side elevation of a chuck jaw showing it as formed for engagement with the pre-formed work shown in Fig. 1;

Fig. 3 is a front elevation of the jaw shown in Fig. 2;

Fig. 4 is an end view of the jaw shown in Fig. 2 as seen in the direction indicated by the arrow 4;

Fig. 5 is a perspective view illustrating the manner of supporting the pre-formed work on a chuck by means of the jaws shown in Figs. 2, 3, and 4;

Fig. 6 is a view in elevation of the chuck shown in Fig. 5 with a portion of the work removed to depict the manner of engaging the pre-formed portion of the work with the chuck jaws;

Fig. 7 is a view in side elevation depicting the manner in which the pre-formed portion of the work may be removed after treatment of the work;

Figs. 8 and 9 are views in elevation of a fragmentary portion of the work depicting modified forms of the pre-conditioned portion of the work.

In carrying out the invention a piece of work to be treated, (indicated at 10 in the drawing) is formed with an axially extending cylindrical hub 11 which is machined to provide it adjacent the tip thereof with a circumferentially extending continuous groove 12 of angular or V-cross section. As here shown in the drawing, the hub 11 constitutes a portion of the work when finished, but the hub may constitute a work-lug formed for removal from the work after machining thereof. The grooved end portion of the hub may also constitute a portion of the finished work but is here shown as a work-lug designed to be removed from the hub, as by severance along the line $a$—$a$, as indicated in Figs. 1 and 7, on completion of machining operations on the work.

The V-groove may be formed with the side walls $b$—$b$ thereof extending perpendicular to each other, as shown in Fig. 1, but such walls may be formed to extend either in obtuse or acute angular relation to each other, as shown in Figs. 8 and 9 respectively, according to requirements. In either event the side walls of the groove are frusto-conical and diverge from points on the axis of the hub, and are arranged with their inner and outer margins disposed on planes extending perpendicular to such axis.

In further carrying out my invention, I provide a chuck 14 with a plurality of centering jaws 15 which are each fitted with a specially formed single tooth 16 for effecting wedge engagement with the groove 12; the tooth 16 being shaped to conform to the side walls of the groove 12 and to this end having a transverse arcuate edge portion of wedge-shaped cross section, the side faces c—c of which edge diverge at an angle corresponding to the angular relation of the walls b—b of the groove 12, and also being curved to seat on the walls b—b circumferentially of the groove.

To afford a slight clearance between the innermost portion of the groove 12 and the jaw tooth 16 the latter is formed with a flat face d on its entrant edge.

The jaws 15 are radially adjustable on the chuck 14 in the conventional manner and in their application are initially retracted to a position to permit positioning of the grooved end of the hub therebetween. To support the work 10, the hub 11 is disposed with the groove 12 tightly engaged by the wedge-shaped teeth 16 as shown in Figs. 5 and 6; the teeth of the several jaws being seated in the groove 12 in clamping wedge engagement with the angularly related walls thereof and by reason of the complementary angular and circumferential contours of the teeth and the walls of the groove, the teeth will act to center the hub 11 and the work 10 thereon relative to the axis of the chuck.

The teeth 16 in projecting into the groove 12 also serve to securely hold the work against displacement and in a position extended outwardly from the chuck so that the work may be machined both interiorly and exteriorly thereof without further support; such machining comprising axial boring of the work and simultaneous tooling of the outer periphery of the work.

After completion of the machining operations on the work, the grooved end portion of the hub 11 may be severed therefrom as indicated in Fig. 7, or it may be reworked should occasion require.

I claim:

1. The method of preparing work for machining consisting in forming a hub on the work having a cylindrical end portion, and forming said end portion at a point axially spaced from the adjacent end thereof with a continuous circumferential groove of V-cross section for the reception of a plurality of chuck jaws having transversely extending arcuate teeth of V-cross section conformable to said groove and constituting the sole means of centering and holding the work.

2. The method of preparing work for machining consisting in forming the work with an axially projection hub, forming the hub at a point axially spaced from the adjacent end thereof with a cylindrical portion concentric with the axis thereof, and forming said cylindrical portion with a continuous circumferentially extending jaw engaging groove of V-cross section, wherein the opposed faces of the V-groove constitute the sole chuck-engaging portions of the work.

3. The method of preparing work for machining consisting in forming the work with an axially projecting hub, forming the hub with a cylindrical portion concentric with the axis thereof, forming said cylindrical portion at a point axially spaced from the adjacent end thereof with a continuous circumferentially extending jaw engaging groove of V-cross section, forming chuck jaws with transverse arcuate teeth of V-cross section conformable to the groove on said hub, and mounting the work with the circumferential groove of the hub engaged by the arcuate teeth of the chuck jaws in such manner that the remainder of the work is free from contact with any part of the chuck.

4. The method of preparing work for machining, consisting in pre-forming the work with a continuous circumferential groove perpendicular to the axis of the work of V-cross section, and supporting the work solely by means of the contact of arcuate wedges with the opposed faces of said groove.

5. The method of preparing work for machining consisting in forming the work with a projecting cylindrical work-lug, and forming said work-lug with a continuous circumferentially extending V-groove with the margins of the walls thereof lying on planes perpendicular to the axis of said work-lug.

CHARLES E. STRAUSS.